United States Patent [19]

Osborne

[11] 4,048,563
[45] Sept. 13, 1977

[54] CARRIER-MODULATED COHERENCY MONITORING SYSTEM

[75] Inventor: Eugene F. Osborne, Westminster, Md.

[73] Assignee: The United States of America as represented by the Secretary of the Navy, Washington, D.C.

[21] Appl. No.: 623,539

[22] Filed: Oct. 17, 1975

[51] Int. Cl.$^2$ .............................................. H04B 7/00
[52] U.S. Cl. ......................................... 325/58; 325/4; 178/69.1; 179/15 BS
[58] Field of Search ........................ 178/69.5 R, 69.1; 340/146.1; 325/4, 41, 321, 65, 58; 343/10; 179/15 BS

[56] References Cited

U.S. PATENT DOCUMENTS

| | | | |
|---|---|---|---|
| 3,305,636 | 2/1967 | Webb ........................ | 178/69.5 R X |
| 3,593,138 | 7/1971 | Dunn et al. ............... | 325/4 |
| 3,766,315 | 10/1973 | Couvillon, Jr. et al. ... | 178/69.5 R |
| 3,854,011 | 12/1974 | Mallory et al. ........... | 178/69.5 R X |
| 3,947,634 | 3/1976 | Betts .......................... | 325/321 X |
| 3,958,083 | 5/1976 | Hara et al. ................. | 178/69.5 R |

OTHER PUBLICATIONS

IBM Technical Disclosure Bulletin, Dec. 1967, vol. 10, No. 7, p. 923.

*Primary Examiner*—Benedict V. Safourek
*Assistant Examiner*—Aristotelis M. Psitos

[57] ABSTRACT

A radio information system is described which uses the exact mathematical ratios and the unique periodic angular coherence of the residual RF carrier and the digitally encoded modulation spectral components of the electromagnetic wave as emitted by a source transmitter (or transmitters) to enhance system performance and to provide new instrumentation and measurement capabilities at the receiver apparatus. The digital modulation synchronizing code occupies a wide frequency bandwidth and is encoded for precise repetitive transmission to provide, for example in a satellite navigation system, a means of accurate synchronization and measurement of time and range parameters. Many encoded sequences of either discrete or pseudo-random types may be used as the synchronizing code. However in the description herein the pseudo-random noise (PRN) codes are used for their added advantage in spread spectrum discrimination against intentional interference. The total or composite RF signal typically also includes non-interfering information or message modulation.

10 Claims, 9 Drawing Figures

SATELLITE-CARRIED
TRANSMITTER APPARATUS

GROUND-BASED RECEIVER APPARATUS

CARRIER-MODULATED COHERENCY MONITORING SYSTEM

BACKGROUND AND SUMMARY OF THE INVENTION

In many well-known radio information systems, such as those employed for navigation, communications, radar and scientific measurements purposes, the RF energy is transmitted in the form of a modulated carrier signal. It is also well-known that when carrier fade is experienced, for example in a scientific measurement system, the fading can cause loss of the desired information. Another well-known problem related to utilizing a received carrier signal for measurement purposes, especially where phase-coherent tracking is employed in a degraded or noisy environment is the $2n\pi$ ambiguity or cycle slippage of phase locked circuits. Loss of phase coherent tracking can be of such short duration that there is no simple way of identifying or accumulating cycle slips, in order to resolve the error. This is of particular importance in ranging or navigation systems where the phase information is utilized for providing precision ranging, range rate or positional information.

In the past, for example, it was proposed to overcome or resolve these phase ambiguity problems by employing statistical smoothing; i.e., by accumulating large quantities of measurements and then processing according to some predetermined algorithm. However, this approach requires the collection of data for a relatively large number of measurements which is very time consuming and requires a large observing or data collection time. This latter requirement was particularly undesirable when the system is operating in a hostile (e.g., warfare) environment, and the observer is exposed to detection.

In order to overcome these and other deficiencies in the prior art, the present invention provides a method and apparatus, employing correlation of independently measured quantities, for accomplishing the detection and the resolution of above-noted $2n\pi$ phase (or wavelength) ambiguities, which may be introduced, for example, by the probabilistic cycle slippage often experienced at a phase locked voltage controlled oscillator (VCO), such as that employed in the coherent carrier recovery circuits of a remote radio receiver.

More particularly, in accordance with the present invention, the transmitting source is purposely designed so that there is numerical certainty in the relationship between the transmitted carrier and a synchronizing code which modulates the carrier, over and above any information or message modulation. On the other hand, it should be understood, the fact that numerical certainty exists in the relationship between the carrier and synchronizing code imposes no requirement that the synchronizing code and carrier be precisely aligned; e.g., at zero crossings, but only that there is a priori knowledge of the relationship between the synchronizing code and the carrier and that such relationship remains fixed and stable. Moreover, although the synchronizing code is always predetermined and is repetitive at a known repetition rate, the synchronizing code may nonetheless change in a random, but known fashion, to assure continued security of the system for long time periods.

As a result of the present invention, by performing recovery and tracking of the synchronizing code relative to a local electronic clock or timing system, there is no ambiguity in the code tracking process, inasmuch as the time duration of the period of the synchronizing code is large; i.e., one hundred times greater, compared to the time uncertainty of the local clock. As a result of these comparative values, plus the fact that the synchronizing code has an irregular, but known, phase pattern whereas in contrast the restored carrier at an output of a phase tracking filter has a regular repetitive and ambiguous phase pattern, any discontinuities or errors in the synchronizing code tracking capability are readily detectable; e.g., momentary losses of time-domain alignment of the local clock with the received synchronizing code. The resultant advantage is that even if signal fade momentarily occurs, the fact that two independent measurements are now being made on the carrier and the synchronizing code, permits correlated processing to improve information recovery. In other words, the proposed apparatus would typically employ phase coherent carrier tracking, with its well-known deficiencies related to ambiguities and noise like errors, plus a delay-lock or time-domain tracking of the synchronizing code.

The present invention thus provides a capability for a continuing numerical monitor and test, at very short intervals throughout the operating time period of active radio reception, of the quality of the system and the validity of measurements of phase and time dependent variables, such as slant range and range rate that indicate dynamic motion between the transmitting and receiving sites.

As is well-known to those skilled in the art, during the radio propagation of the RF wave, the carrier component travels at phase velocity and the encoded modulation function travels at an ensemble or group velocity, and refraction in the non-ideal path accelerates the arrival of carrier phase but delays the arrival of the modulation. In navigation, in tracking, or in range determining applications where the likelihood of receiver equipment malfunction or VCO cycle slippage is negligible, this invention permits a "microscopic" (data point by data point) determination of such refraction effects in a single channel radio system and offers simplicity and cost savings. Essentially independent measurements of the accumulative carrier phase and of the length of the modulation frame interval (or intervals), taken in essentially the same simultaneous sampling period, will each contain effects of refraction in opposing sense so that time correlated computations would achieve cancellation of the refraction errors.

As will be described in more detail hereinafter, in one embodiment of the invention, mutual aided tracking is employed between the separate circuits which recover and separately track the PRN modulation and the carrier signals respectively, resulting in enhanced performance, synchronization and demodulation. With such mutual aiding, moreover, the receiver performance is dependent on the received composite signal power to noise ratio rather than only the carrier power to noise and modulation power to noise ratios separately. Also as a consequence of mutual aided tracking, the system designer is given greater flexibility in design of the radio source signal. He has, for example, new freedom in the selection of phase modulation indices or phase states, which determines the transmitted power budget as between the residual RF carrier and message modulations, and the PRN wideband modulation components of the composite RF signal.

During use, the carrier-modulation coherency monitoring and measurement techniques provided by the present invention most typically apply to information transmission systems that employ digital angular modulation of either the frequency or phase shift types. Applications are also seen in the areas of communications, in radio navigation aids where the transmitting reference source may be located either on earth or in space, in coherent (beacon) vehicle tracking, in dissemination systems for the broadcast of standard times references, in IFF and information security systems, and in radio ranging systems of either the passive one-way or the active two-way radar types, among others. One particularly important application contemplated for the invention, and one of its primary objects, is improvement to the U.S. Navy's current Navigation Satellite System (NNSS) more commonly known as TRANSIT. As is well-known, in the NNSS, position fixes are uniquely computed by the using navigators from measured values of the observed Doppler frequency shift to the satellite-transmitted RF carrier signals as they are received, relative to a local precision reference of time and frequency, as the satellite passes in its low altitude (600n mi) orbit above the geoid, and using orbital parameters of the satellite as broadcast in the message modulation to the carrier.

Other objects, purposes and characteristics of the present invention will, in part, be pointed out as the description of the invention progresses and, in part, be obvious from the accompanying drawings, wherein.

Figure 1:
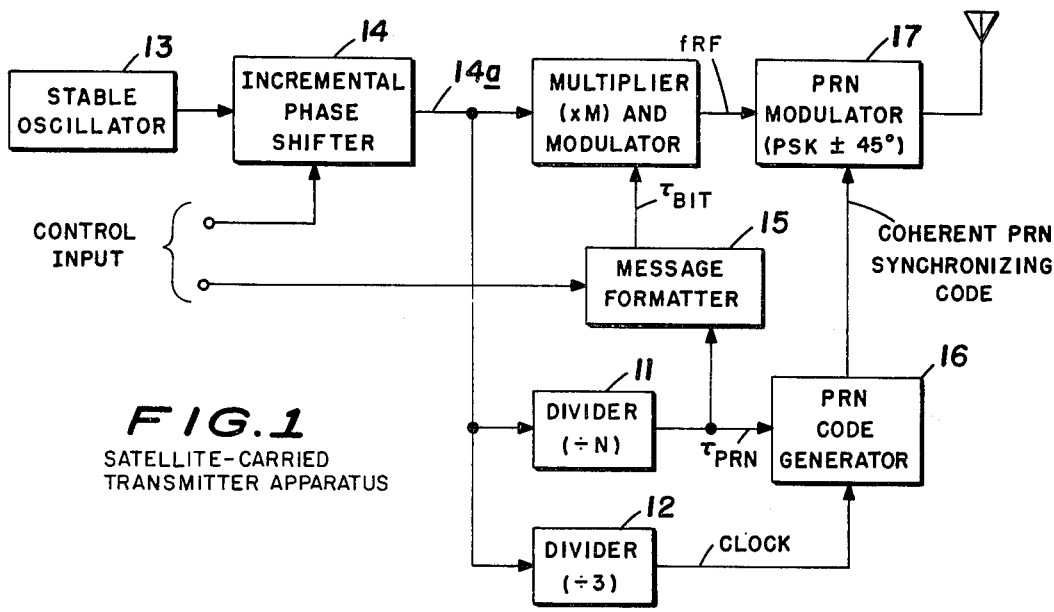
FIG. 1 is a schematic block diagram of conventional transmitter apparatus such as that employed onboard a satellite in the Navy Navigation Satellite System, modified in accordance with the present invention.

FIG. 1 illustrates in block diagram form a portion of a satellite-carried transmitting source, in this case the well-known NNSS satellite modified in accordance with the present invention. As shown, the RF carrier, the data message bit interval ($\tau_{bit}$), and the PRN code length or frame interval ($\tau_{PRN}$) are all coherently synthesized by numerical frequency multiplication, at multiplier 10, and division, at dividers 11 and 12, of a normalized reference frequency produced by the reference oscillator 13 and associated incremental phase shifter (IPS) 14. The IPS unit 14 operates in a manner well-known to those skilled in the art to maintain a precise reference frequency standard on output line 14a and might, for example, be comprised of circuitry disclosed in U.S. Pat. No. 3,781,706 issued Dec. 25, 1973. In one practical application of the present invention, the normalized reference frequency is maintained at $5(1-84.48 \times 10^{-6})$ MHz; whereas, for a two channel system in the TRANSIT satellite series, the multiplier M for unit 10 has high and low values of 80 and 30 respectively (i.e., carriers of 400 MHz and 150 MHz) and divisor N for unit 11 has a value of 98304.

As will be described in more detail hereinafter, there are exactly M times N cycles of the RF carrier accumulating within the precise interval of one PRN encoded sequence, $\tau_{PRN}$ which is taken for convenience in the illustrated embodiment as the same interval as that of a message data bit ($\tau_{bit} = 120/6103$ second). This is accomplished, as shown in FIG. 1, by controlling both the message formatter 15 and PRN code generator 16 with the output of the divide-by-N unit 11. As shown in FIG. 1, a PRN modulator 17 is controlled by the PRN synchronizing code from generator 16 and performs phase shift keyed (PSK) modulation of the RF carrier, with plus and minus 45° phase states, putting half the RF energy in the spread PRN spectrum and leaving half in RF carrier and message modulation. During each time frame of the PRN or synchronizing code (equal to message bit interval); i.e., the time between repeating values of the PRN, a large number of phase transients of PRN occur equal, for example, to $2^n-1$ where (n) corresponds to the number of registers in the PRN generator 16.

Figure 2:
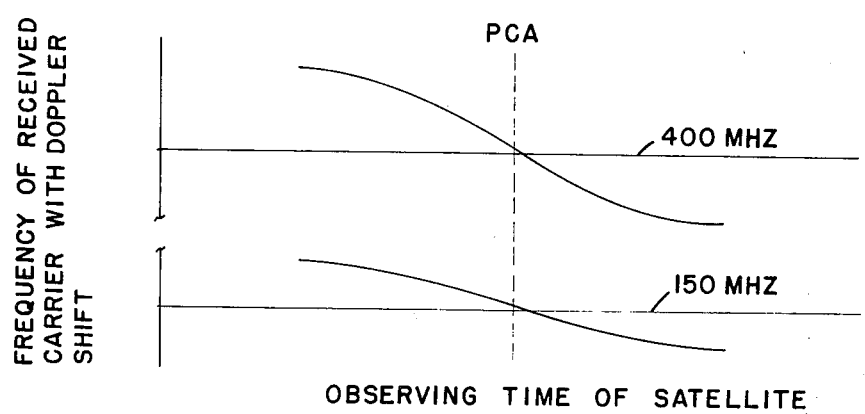
FIGS. 2, 3 and 4 are plots illustrating various functional effects that are observed at the navigator's receiver which are caused by dynamic motion between the orbiting satellite-carried transmitter and a earth receiving station in such a satellite navigation system.
Figure 3:
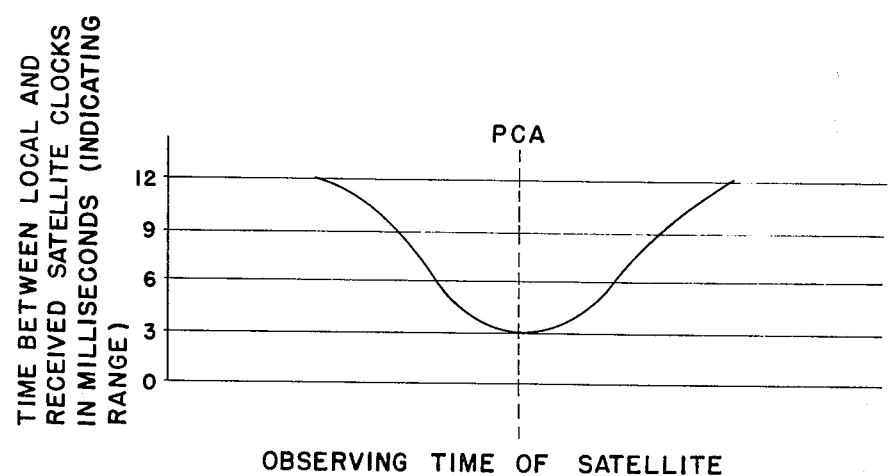
Figure 4:
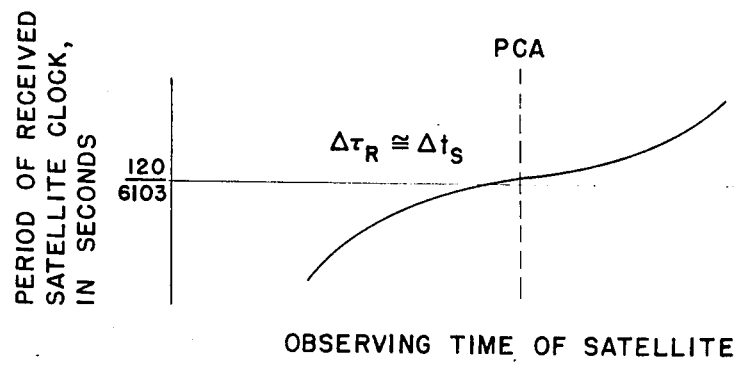

FIGS. 2, 3 and 4 illustrate certain well-known effects caused by relative motion between the orbiting satellite-carried transmitter and the ground-based receiver (navigator) apparatus. Thus, FIG. 2 illustrates the effect of dynamic motion between the orbiting satellite and the earth station, as reflected by frequency shift of the received RF carrier signals versus time during the observation, where the dashed line labelled PCA represents the point-of-closest approach of the satellite to the observer. The shift from the nominal value, and shape of the function, depends as is well-known on relative satellite-observer space geometry. FIG. 3, on the other hand, reflects the variation in slant range with time, during the satellite pass, between the satellite and the observer as measurable from received satellite timing modulation relative to a precise local clock at the user location. FIG. 4 illustrates that the period of the satellite clock (defined as a message bit interval or as one length of the PRN modulating sequence), as it is recovered from received satellite signals at the earth observer site, varies about the nominal value in such a manner that it appears to have a shorter period while the satellite approaches and a longer period as the satellite recedes from closest approach.

As noted above, if at any microportion of the total satellite pass interval an error free count is made of the number of RF cycles of the carrier component of the satellite signal existing within the period of the satellite clock (equal to bit interval or PRN code length) as received and as demarcated by the coherently related modulation components of the satellite signal, a precise and invariant number (M × N) of carrier cycles will always result and deviation of counts from this invariant number will be an indication of system error. In practical terms, then, if an events counter is counting the cycles of an RF signal whose frequency varies as in FIG. 2, with the events counter triggered to start at the beginning and triggered to stop at the ending of a single PRN sequence whose period varies as in FIG. 4, the number registered by the counter at the end of count will be the invariant associated with the channel being used. For example, in the illustrated embodiment, if M = 30 and N = 98304, such an events counter will register a count of 2,949,120 for the 150 MHz or low channel of the TRANSIT satellite system.

Figure 5:
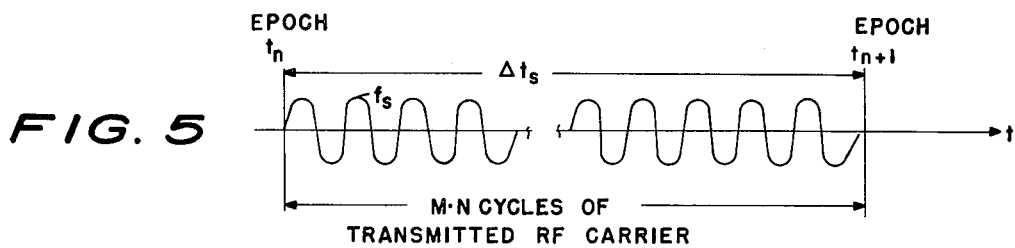
FIGS. 5, 6 and 7 are plots illustrative of the coherency relationship between frame markers of the synchronizing code and a typical RF carrier signal as transmitted and received in such a system.

It will also be noted that, for coordinated reception and measurements by the user, the total phase angle ($\phi_s$) of the RF carrier component of the transmitted signal that accumulates between two of the periodic PRN modulation timing states or fiducial marks that span a fixed time interval of $\Delta t_s$ seconds, at the satellite, equals the total phase angle ($\phi_R$) of the doppler shifted carrier component of the RF satellite signal that accumulates in a variable time interval, $\Delta \tau_R$, between the same (or similar) PRN fiducial marks as received, after propagation of the modulated RF signal through the dynamically varying path length, when the measurements are made relative to the user's time and frequency standards. Symbolically, $$\phi_s \bigg|_{\Delta t_s} = \phi_R \bigg|_{\Delta \tau_R} \quad \text{(radians)} \qquad \text{Eq. 1}$$

or, if expressed in terms of the angular frequencies of the RF waves $$\omega_s \Delta t_s = \int_{\tau_n}^{\tau_{n+1}} \omega_s (1 - \frac{\dot{\rho}(t)}{C_{(\phi)}} + \ldots) dt \qquad \text{Eq. 2}$$

where $\omega_s$ = exact (RF) carrier frequency, at the satellite transmitter, in radians per second, and $\dot{\rho}(t)/C_{(\phi)}$ = non-dimensional propagation delay rate of the carrier signal, $\dot{\rho}(t)$ being range rate and $C_{(\phi)}$ being the phase velocity of carrier signal propagation. Correspondingly, if phase is measured in $2\pi$ increments, the accumulated number of cycles received between selected modulation marks must equal the number transmitted (see FIGS. 5, 6 and 7), or $$f_s \Delta t_s = \int_{\tau_n}^{\tau_{n+1}} f_s (1 - \frac{\dot{\rho}(t)}{C_{(\phi)}} + \ldots) dt \text{ (cycles)} \qquad \text{Eq. 3}$$

If the integration interval is short, as it would be for adjacent PRN marks or for intervals typically of the one second variety spanning several marks, the criterion for error free reception can be expressed by the approximation:

$$f_s \Delta t_s = f_s (1 - \frac{\tilde{\dot{\rho}}}{C_{(\phi)}}) \Delta \tau_R \text{ (cycles)} \qquad \text{Eq. 4}$$

where $\tilde{\dot{\rho}}$ is the average range rate over the interval $\Delta \tau_R$.

At the satellite (see FIG. 5), the epochs $\tau n$, $\tau n+1$, etc. correspond to specific dates in Universal Time (UT) scaled to coincide with bit intervals and PRN epochs (as transmitted), and the number of cycles transmitted between PRN marks is a constant quantity determined by the system design and physical fabrication, $$f_s \Delta t_s = MN = Q \text{ (cycles)} \qquad \text{Eq. 5}$$

so that (in a test measurement interval between PRN code length markers $n$ and $n+1$ at any arbitrary time during a satellite pass)

$$Q(\text{Test}) = f_s (1 - \frac{\tilde{\dot{\rho}}}{C_{(\phi)}}) \Delta \tau_R \text{ (cycles)} \qquad \text{Eq. 6}$$

where the right-hand term $f_s (1 - \dot{\rho}/C_{(\phi)})$ is the frequency of the doppler shifted carrier component of the satellite RF signal, as recovered by phase-locked loop tracking in a background of receiver and antenna noise. As is well-known to those skilled in the art, the varying time interval $\Delta \tau_R$ can readily be recovered independently from the background noise for example, by a delay-locked tracking subsystem that is synchronized to the PRN modulation of the received satellite signal. Moreover, such delay lock tracking of PRN codes can be accomplished free of ambiguity, in contrast to the ambiguities and errors in phase-locked tracking of a sinusoid carrier.

Figure 6:
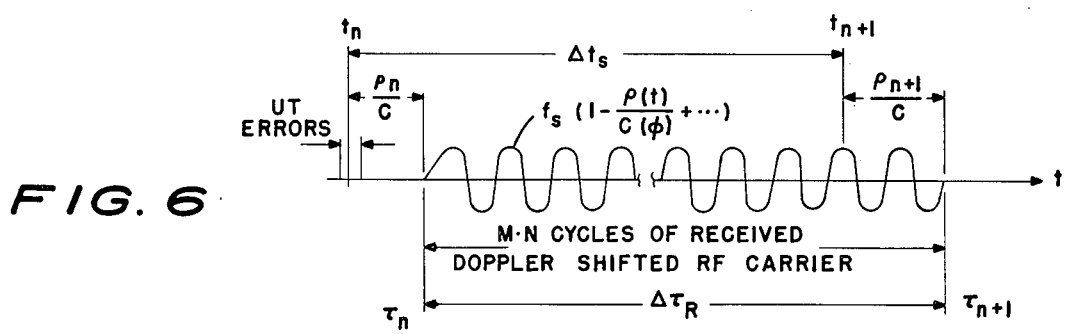
Figure 7:
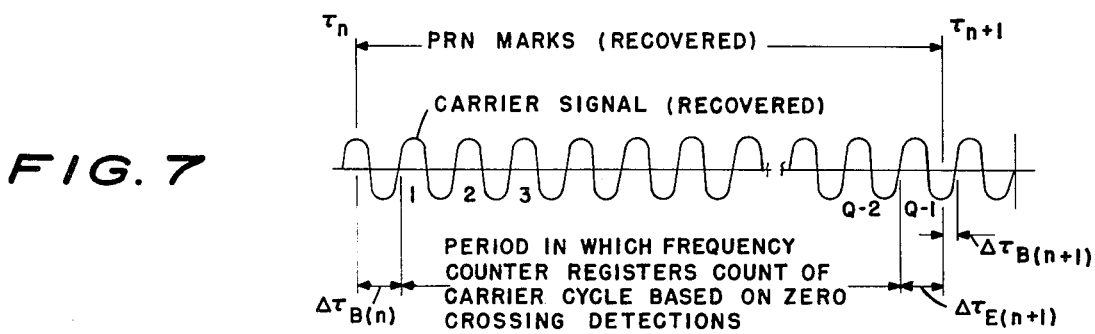

Referring now more specifically to FIGS. 6 and 7, at the user's receiver the synchronized PRn modulation interval $\Delta \tau_R$ (equal to $\tau_{n+1} - \tau_n$), obtained by such delay lock tracking, varies during the satellite pass because the slant range ($\rho$) changes with satellite-to-user relative motion. Assuming no error in measurement or in signal transmission, the observed PRN code interval is:

$$\Delta \tau_R = \Delta t_s + \frac{\rho_{n+1} - \rho_n}{C_{(g)}} \qquad \text{Eq. 7}$$

or $$\Delta \tau_R = \Delta t_s + \frac{\Delta \rho}{C_{(g)}}, \text{ seconds,} \qquad \text{Eq. 8}$$

where $C_{(g)}$ is the velocity of group propagation.

Substituting for $\Delta \tau_R$ in Eq. 4 and eliminating the radio frequency of transmission, an alternate statement of the coherency criterion is obtained in units of time as:

$$\frac{\tilde{\dot{\rho}}}{C_{(\phi)}} (\Delta t_s + \frac{\rho_{n+1} - \rho_n}{C_{(g)}}) = \frac{\rho_{n+1} - \rho_n}{C_{(g)}}, \text{ seconds}, \qquad \text{Eq. 9}$$

from which it should be noted that, in a vacuum where the phase and group velocities of propagation are equal, i.e. $C(\phi) = C(g) = C$, the Eq. 9 reduces to $$\tilde{\dot{\rho}} (\Delta t_s + \frac{\rho_{n+1} - \rho_n}{C}) = \rho_{n+1} - \rho_n, \text{ meters}, \qquad \text{Eq. 10}$$

which in effect states simply that the product of the average range rate and the time interval equals the distance traveled by the satellite toward (or from) the user's antenna (assumed to be stationary in order to simplify the discussion). As expressed in Eq. 9:

$\tilde{\dot{\rho}}/C_{(\phi)}$ = the average doppler shift for the interval expressed in parts, determinable by phase-locked tracking and measurement of the received carrier signal.

$(\Delta t_s + \frac{\rho_{n+1} - \rho_n}{C_{(g)}}) = \Delta \tau_R =$ the total time interval between successive PRN marks as recovered by delay-locked synchronization, tracking and measurement of the received synchronizing code modulation, and $\rho_{n+1} - \rho_n/C_{(g)}$ = the differential propagation delay indicated between propagation delay measurements made at the $n^{th}$ and $(n+1)^{th}$ PRN marks from the delay-locked receiver as measured against the user's local reference of time.

Obviously, if the time interval scale $\Delta t_s$ of the satellite is determinable or precisely normalized against Universal Time (UT) or some other standard reference of time interval, then it will be sufficient for the user to measure, from the PRN subsystem only, the indicated propagation delay $\rho/C_{(g)}$ at selected PRN marks.

To those familiar with PRN code digital generators and modulation, the PRN dates or fiducial markers are those epochs or points in real time occurring at intervals corresponding to the PRN code length, and typically being demarcated by an output pulse emitted from the code generator, for reference and measurement purposes, when all stages of the generator are in the same (e.g. all zeros) digital state. In the illustrated embodiment of the present invention, these PRN reference pulses are recovered in the receiving apparatus as will be described hereinafter, and used to generate start and stop trigger pulses that control counters in the measurement instrumentation proposed in accordance with the present invention.

The problems in scaling of the essential data obtained, by measurement in a given practical application of the proposed system, may be avoided if the criterion for validity is developed in a non-dimensional form describing the system dynamics. Thus, further rearrangement of Eq. 9 gives $$\frac{\tilde{\dot{\rho}}}{C_{(\phi)}} = \frac{\frac{\rho_{n+1}}{C_{(g)}} - \frac{\rho_n}{C_{(g)}}}{\Delta t_s + \frac{\rho_{n+1}}{C_{(g)}} - \frac{\rho_n}{C_{(g)}}} \quad \text{Eq. 11}$$

where each side of this equation is a numerical value which can be expressed in parts. The form of Eq. 11 is convenient for it allows comparisons among the various methods of measurement (providing that adequate registry in running time can be maintained) where:

$\tilde{\dot{\rho}}/C_{(\phi)}$ = (fixed cycle count of received carrier with measurement of overflow relative to local clock utilized for example in navigation receive type AN/BRN-3)

$\tilde{\dot{\rho}}/C_{(\phi, g)}$ = (variable cycle count of received carrier gated by apparent sattelite clock as received, an AN/SRN-9 type measurement)

$\tilde{\dot{\rho}}/C_{(g)}$ = (variable propagation delay measured over an observation interval using PRN modulation and local clock, as proposed in accordance with present invention)

As regards the types of instrumentation errors that degrade measurement accuracy, the coherency criteria for coordinated measurement of the doppler shifted carrier and propagation delayed modulation components of the satellite signal have so far been described for the ideal error free case, in order to simplify the present discussion. It is now appropriate to consider the types of errors and malfunctions of the instrumentation that degrade measurements, for which the proposed method and apparatus and the related coherency criteria permit a test of quality achieved during the satellite pass. In the discussions to follow, it is assumed that measurements of the received doppler shifter carrier signal are made by counting the zero crossings of a phase-locked filtered satellite signal.

It is also assumed that a mere departure from time coincidence of the PRN marks and zero phase positions of the carrier signal is not a malfunction, even though coincidence may have existed at the satellite transmitter. To insure coincidence would require delay equalization with unnecessary hardware complications at both the satellite transmitter and the user's receiver. A delay bias of $(2n\pi + \phi)$ radians of the carrier relative to modulation fiducial markers is thus considered permissible (see FIG. 7).

Delay bias has an impact on the measurement of the average doppler shift registered by counting the received carrier cycles, and also an impact on the cycles received equals cycles transmitted criterion discussed above, in that quality will require $$Q = f_s \Delta t_s = f_s (1 - \frac{\tilde{\dot{\rho}}}{C})\Delta\tau_R + (0, -1) + \overline{\Delta\tau_{B(n)} + \Delta\tau_{E(n+1)}} \tilde{f} \quad \text{Eq. 12}$$

cycles transmitted | cycles received and counted where, in an error free system, $$[\Delta\tau_{B(n)} + \Delta\tau_{E(n+1)}]\tilde{f} = 1 \text{ cycle,} \quad \text{Eq. 13}$$

$\tilde{f}$ is the average frequency at the point of measurement within interval $\tau_n$ to $\tau_{n+1}$. However, as will be shown later, in general the summation of the beginning and ending segments will not equal an exact cycle and must therefore be measured. Again for measurement convenience it will be preferable to implement measurement of beginning segments only and determine, e.g. in software:

$$[\Delta\tau_{B(n)} + (1 - \Delta\tau_{B(n+1)})]\tilde{f} \simeq [\Delta\tau_{B(n)} + \Delta\tau_{E(n+1)}]\tilde{f}$$

or, if the validation interval is very long, it may be preferable to determine $$\Delta\tau_{B(n)}f_n + (1 - \Delta\tau_{B(n+1)})f_{n+1}$$

In the navigation set, ideal performance will also be degraded by the introduction of errors in the signal receiving and measurement processes. As implied earlier, the accuracy of the measurements of navigation quantities will be degraded for example in:
a. The phase-locked carrier tracking loop:
  1. differential changes in the ordinary phase error of the output signal due to noise and dynamic response while in a continuous tracking mode;
  2. differential changes in phase error at the output caused by transient conditions that temporarily destroy phase coherent tracking but which permit automatic resynchronization to an arbitrary phase singularity of the periodic carrier wave, removed some $2n\pi$ from the correct integrated phase position of the received signal (ambiguity error);
  3. the addition or subtraction of an integral number of zero crossings of the output signal caused by the cycle slippage of the VCO while the phase-locked loop is operating under marginal signal-to-noise ratio.
b. The delay-locked PRN recovery loop:
  1. noise jitter and dynamic tracking error in the recovery of received satellite timing marks (pulses delivered to the measurement subsystems).
c. The measurement subsystem:
  1. the scaling factor(s) of the analog refraction combining circuits can amplify or reduce the effects of error in the receiving system, for example, errors in the 400 MHz receiver are multiplied by a factor of 2, in 150 MHz receiver by 3/4.

With the error sources listed in (a) and (b) above, a simple single channel RF phase-locked receiver, with measurement interval control provided by the receiver PRN marks, as proposed in accordance with the present invention, will provide a cycle count of:

which is started by the $n^{th}$ PRN pulse and stopped by the $(n + m + 1)^{th}$ PRN pulse. The total content of this register is always an integral whole number.

The particular manner in which the present invention is implemented, in hardware and/or in software, can of course take several forms, depending on the end usage desired and the accuracy level to be achieved. Moreover, for the applications that are visualized, implemen- $$mQ_x(\text{cycles}) = f_s(1 - \frac{\tilde{\rho}}{C_{(\phi)}})(m\Delta t_s + \frac{\Delta \rho}{C_{(g)}}) + (0, -1) \pm f_s(1 - \frac{\tilde{\rho}}{C_{(\phi)}})\Delta\delta\tau$$
$$\quad\quad\quad\quad (1) \quad\quad\quad\quad\quad\quad\quad\quad\quad\quad (2)$$

$$\pm R_{x(s)} + \frac{1}{2\pi}\left\{\Delta\phi = [\Delta\tau_{B(n)} + (1 - \Delta\tau_{B(n+m+1)}) \pm \Delta\delta\tau]2\pi f_s(1 - \frac{\tilde{\rho}}{C_{(\phi)}})\right\} \quad \text{Eq. 14}$$
$$\quad (3) \quad\quad\quad\quad\quad\quad\quad (4)$$

where: $mQ_x$ is the total count of cycles and fraction of cycles, measured between PRN trigger pulses at $\tau_{(n)}$ and $\tau_{(n + m - 1)}$ spanning $m$ intervals of the repetitive PRN code, term (1) to the right of the equal sign represents the integral number of cycles of the true doppler shifted carrier signal measurable in the ideal PRN mark-to-mark interval, and where − 1 represents the events counter uncertainty due to a cycle normally lost because of non-coincidence of carrier zero crossings with mark occurrence due to systems delay bias as discussed above;

term (2) accounts for the number of full carrier cycles that would accumulate within the differential mark-to-mark PRN error interval (random error) for an error free carrier tracking phase-lock loop synchronized to the true doppler shifted signal;

term (3) is the net number of integral cycles (0, 1, 2 . . . ) added or subtracted during the total measurement interval from PRN mark-to-mark, constituting cycle slippage between the output of the phase-lock loop VCO (being counted) and the true received signal; and term (4) always having a value of less than 1, representing the remaining fraction of a cycle occurring in two segments, one at the beginning and one at the ending of the measurement interval. The term (4) accounts for (a) the delay bias which causes non-coincidence between the carrier and PRN marks and, in addition, the term reflects the sum of the dynamic phase-lock loop phase error differentially occurring due to noise and tracking forces, during the interval of the measurement, and also includes any residual fraction of a cycle due to resynchronization of the loop, after temporary loss of coherence to the signal, to the $2n\pi$ ambiguity singularities of the carrier waveform as well as any residual fraction of cycle due to true signal accumulating in the PRN jitter error interval.

It should be noted that as these phase error sources indicated by term 4 in Eq. 14 increase so that the sum exceeds $2\pi$ radians, the effect is to increase (or decrease) $Q_x$ by 1 count, so that $\Delta\phi$ then becomes a remainder of $<2\pi$ radians. Note also (see FIG. 7) that special instrumentation, in addition to the PRN gated cycle counter, is required to measure $\Delta\phi$ in terms of $\Delta\tau_{B(n)}$ and $\Delta\tau_{E(n + m + 1)}$. As will be described in detail hereinafter, the three terms identified at (1), (2) and (3) in Eq. 14 are all measured simultaneously and jointly by a single events counter register actuated, for example, by a Schmidt trigger circuit which pulses at the zero crossings of the smoothed output carrier wave and tation can be accomplished with standard components and electronic circuits, commercially obtainable. By way of example, FIG. 8 of the drawings shows the subsystems and information flow that can be utilized to embody the invention for one version of a receiving set having utility within the well-known TRANSIT navigational satellite system.

Figure 8:
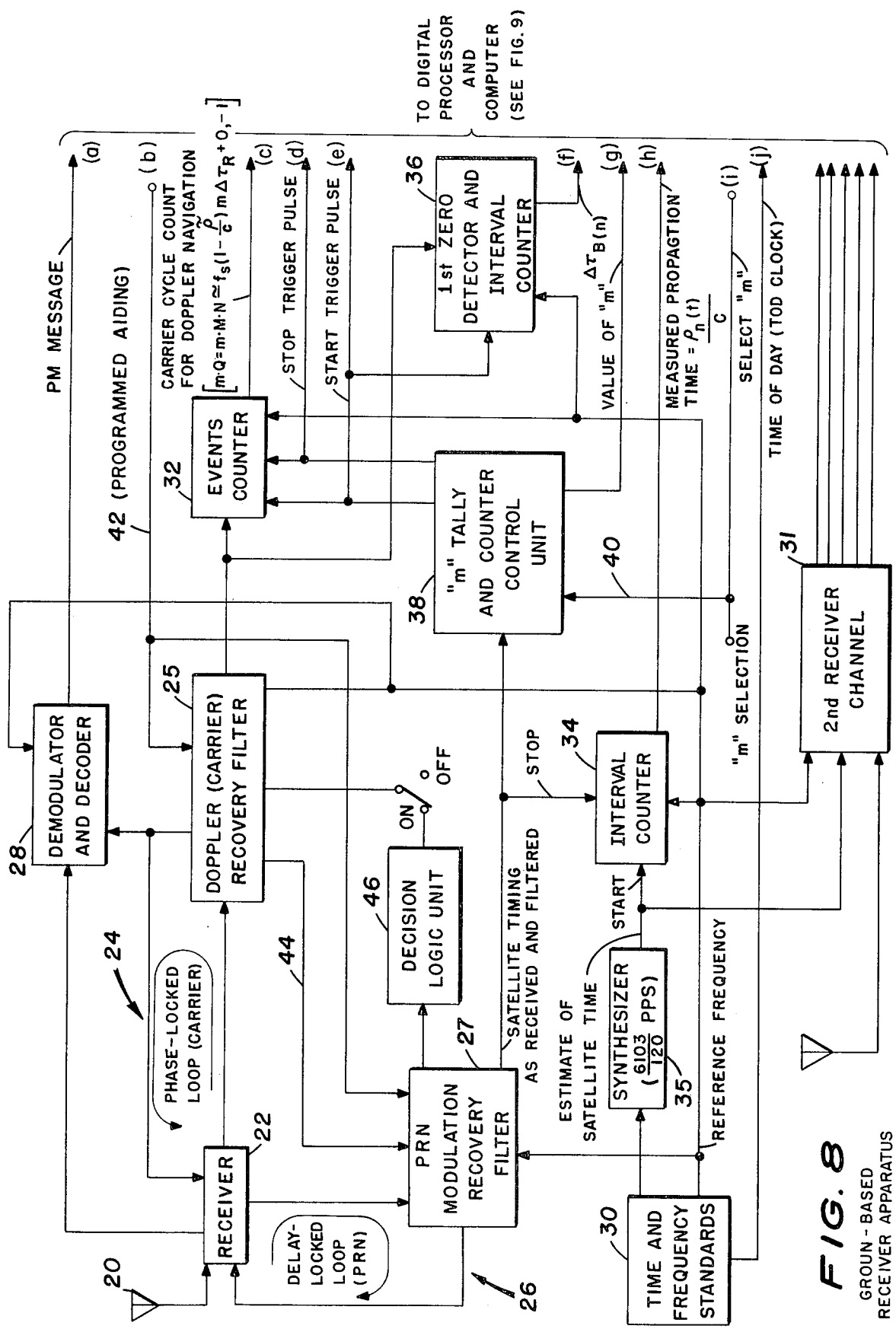
FIG. 8 is a detailed block diagram of receiver apparatus constituting one embodiment of the present invention for performing carrier/modulation coherency measurements; and, FIG. 9 is a functional block diagram of computer apparatus usable with the illustrated embodiment of the invention.

As shown in FIG. 8, the proposed apparatus embodying the invention includes conventional equipment, such as, a suitable antenna(s) 20 and receiver/amplifier 22; a phase-locked loop 24, including filter 25, for carrier recovery and noise filtering in the presence of doppler shifts; a delay-locked loop 26, including filter 27, for PRN modulation recovery and synchronization to the received satellite timing, as inherent within the spread spectrum digital sequences previously described in connection with FIG. 1. In addition, a phase modulation (PM) demodulator and decoder 28 recovers the intelligence (messages transmitted); and, a source 30 of time and frequency standards, which is synchronized to Universal Time (UT), provides references to the system. In keeping with conventional navigation receiver apparatus, a similar second channel 31 could be provided for simultaneous coherent operation in a different frequency band, if desired.

The measurement subsystem proposed in accordance with the present invention includes an events counter 32 connected to the output of the carrier recovery filter portion of phase-locked loop 24 for measurement of the number of full cycles of the received carrier, as determined for example by zero crossing detection of the carrier wave as discussed above. The carrier frequency signal applied to the events counter 32 may be scaled, if desired.

An interval counter 34 is controlled (to start) by the output of a synthesizer 35 which translates UT to the satellite epoch marker scale; i.e., unit 35 ouputs pulses at a 6103/120 pulse per second rate representing an estimate of satellite epoch marker transmission timing. Stop control for the interval counter 34 is provided by the actual satellite timing marks, as recovered by the PRN delay-locked loop 26. As a result, the count registered at counter 34 represents a measurement of the signal propagation time elapsed between the estimated time of transmission at the satellite (FIG. 1) and the time of actual reception and detection at the receiving set (FIG. 8).

A first zero detector and interval counter 36 monitors the carrier frequency output of the carrier recovery filter and senses the first zero crossing of the carrier wave after the start of a measurement sample (to be described) in order to measure the fractional cycle components designated $\Delta\tau_{B(n)}$ and $\Delta\tau_{B(n+1)}$ in FIG. 7, as necessary for the quantitative determination of term 4 of Equation 14 described above. By way of example, zero crossing detector/interval counter 36 could be comprised of a gated Schmidt trigger circuit and a counter operated in a time interval mode, both of which would be enabled by the START trigger pulse which is output from an $m$ tally and counter control unit 38 and which occurs at the times $\tau_n$, $\tau_{n+1}$, etc., coincident with the recovered PRN marks as illustrated in FIG. 7. Specifically, the counter portion of unit 36 (using a reference frequency signal from the time and frequency standard 30) begins measurement of the interval $\Delta\tau_{B(n)}$ at the time $\tau_n$; whereas, the Schmidt trigger of unit 36 monitors the carrier signal output of the doppler recovery filter 25 and detects its first positive zero crossing after the measurement begins. When this first zero crossing is detected, a trigger pulse is generated by the zero crossing detector portion of 36 demarcating the end of the $\Delta\tau_{B(n)}$ interval and is used to stop the interval counter of 36 (for readout of the data therein to the digital processor and computer apparatus of FIG.9) and to subsequently reset the unit 36 for the next measurement. As shown in FIG.7 of the drawings, the zero crossing of the carrier signal will not generally be coincident with the transition time of the PRN markers, as received and processed to the points of measurement; i.e., at the inputs to events counter 32. Accordingly, the unit 36 also registers a count corresponding to the delay bias and phase error ($\Delta\tau_{B(n)}$) between the recovered carrier and modulation, in order to account for the fraction of one cycle of the carrier not counted by the primary carrier cycle counter 32.

The various counter units 32, 34 and 36 included in the illustrated apparatus of FIG. 8 are all conventional and commercially available. By way of examples, reference can be made to 1973 edition of the annual Hewlett-Packard catalog entitled Electronic Instruments and System, section on electronic counters (beginning on page 247).

The $m$ tally and counter control unit 38 is connected to the PRN recovery filter 27 and responds to the satellite timing marks recovered by the PRN delay lock loop 26. This permits a selection (via control line 40 in FIG. 8) of the measurement sample size, i.e., the number of pseudo-random code sequences over which each cycle count measurement is to be made. This tally and counter control unit 38 is provided inasmuch as the number of $\Delta\tau_R$ intervals (see FIG. 6) is too large for convenient use (for example, in the NNSS there are normally 50 intervals per second) and therefore it is desired to select a longer interval of $m \cdot \Delta\tau_R$ as the measurement sampling time. In other words, the events counter 32 would be started at a selected PRN marker (for example at $\tau_n$ in FIG. 7) and stopped (m) markers later; with restart for the next measurement at the i(m + 1)$^{th}$ marker, where $i = 1, 2, 3 \ldots$ By way of example, (m) might typically be selected to have a value of fifty, where $\Delta\tau_R$ is nominally about twenty milleseconds, so as to produce a sampling time for each measurement of about one second.

To achieve the operation just described, the $m$ tally and counter control unit 38 could be comprised, for example, simply of a pulse rate dividing counter well known in the digital logic circuit field. Moreover, if the quantity $m$ is to be in all cases a fixed number, a permanently-wired digital register may then be used to accumulate repetitively counts of $m$ input pulses, while transferring (gating through and out) input pulses at counts of 1 and on register overflow at subsequent counts of $m$; these transferred pulses being utilized as the START and STOP trigger pulses respectively for the control of counters 32 and 36 in FIG. 8. On the other hand, if the quantity $m$ is to be a variable quantity, selectable by command for example, then the control unit 38 such as that shown in FIG. 7 of U.S. Pat. No. 3,781,706 and modified by obvious means for the additional output pulse at a count of 1 could be used.

The local time and frequency standard source 30 operates typically at a cardinal value of reference frequency, for example 5 MHz, zero parts per million offset relative to UT. Since the TRANSIT satellite frequency and timing operate at minus at 84.48 parts per million offset, as noted above, the synthesizer unit 35 is provided along with suitable epoch adjustment capability, if desired, for calibration of the receiving apparatus to UT reference.

As is well-known to those skilled in the satellite navigation art, programmed general purpose digital computer apparatus can be employed to register and compute satellite and user positional information, and to control periodic updating of the orbital parameters onboard the satellites. A thorough discussion of such application of programmed computers is contained in the *Bell System Technical Journal*, Vol. XLII, dated July 1963 (pages 1213 through 1382). Additionally, a computer, along with knowledge of time (e.g. from source 30) and the approximate geometry, can provide programmed aiding for acquisition and tracking for either or both carrier and PRN modulation, as represented in FIG. 8 by the line 42 labelled PROGRAMMED AIDING. Such programmed aided tracking of input signals is well-known to those skilled in the art, as evidenced for example by the discussion contained in the *Proceedings of the Symposium on Computer Processing in Communications*, Vol. XIX published by the Polytechnic Press of the Polytechnic Institute of Brooklyn (1939), Sessions V through X.

In FIG. 8 of the drawings, the carrier and PRN tracking loops/recovery filters 24, 25 and 26, 27 are interconnected for mutual aiding. Thus, information as recovered from the carrier tracking loop 24 and recovery filter 25 can, if desired, be scaled and applied as a frequency adjustment to the reference used in the PRN modulation delay-locked loop, as represented at line 44, thereby reducing its performance requirement for acquisition and tracking in the frequency domain. In other words, the signal on line 44, indicating the carrier being tracked and providing information pertinent to doppler shift in the frequency domain, as in FIG. 2, can be scaled, by conventional frequency division and synthesis techniques to match the doppler shift to the frequency of the synchronizing code and used to aid tracking of the PRN synchronizing code in the time domain. This signal on line 44 might be extracted, for example, from the noise free (output) side of the VCO used in the carrier tracking loop and used to synthesize a reference frequency for the PRN tracking loop to automatically account for range rate so that this latter loop need only synchronize epoch of date-wise. Similarly, and at the same time, stated differently, the control signal on line 44 aids recovery of the PRN code by positioning the delay lock loop 26 to operate at the current frequency of the received RF carrier signal. The recovered PRN modulation can, if selected by logic unit 46 for example, be employed to aid in recovery of the carrier signal; i.e., information derived from the delay-locked tracking of the PRN modulation spectra, representative of tracking in the time domain (see FIG. 4), is supplied as a forcing signal to aid in the tracking of the carrier component of the received signal by the phase-locked doppler recovery filter 25.

The composition of the decision logic unit 46 is obviously dependent upon the requirements of practice and is of conventional design, in which an amplitude sensing correlator, threshold and tracking-not tracking decision circuits, plus weighting functions, are all basic and well understood. For general background in the area of interconnected tracking loops, reference is made to an article by Lindsey entitled "Hybrid Carrier and Modulation Tracking Loops", *IEEE Transaction on Communications,* Vol. COM-20 dated Feb. 20, 1972. More specifically, the recovery filter 27 of the conventional delay-locked tracking loop 26 contains detection circuitry which detects the locked-not locked state of the loop 26 and produces the delay error signal which is used as feedback control to track the incoming PRN modulation spectra. The logic unit 46 responds to the locked-not locked state of the delay-locked loop 26 such that, if loop 26 is locked and tracking, the delay error signal is coupled from the PRN recovery filter 27 to the doppler recovery filter 25 where it aids the phase tracking of the received carrier component. For example, this error signal from the PRN recovery filter 27 would be summed electrically with the phase error signal of the conventional phase-locked loop 24 (e.g. in the low pass filter/control amplifier portion of loop 24) and thereby aids in adjusting the voltage controlled oscillator (VCO) in the recovery filter 25 of the phase-locked loop to the frequency of the incoming carrier signal. In other words, the decision logic unit 26 couples a control signal from recovery filter 27, when the delay-locked loop 26 is locked and tracking the received PRN signal, to the recovery filter 25 where such control signal enhances or "tightens" phase-locked loop tracking of the received carrier, and thereby enhances overall system performance, especially during poor signal-to-noise conditions. As shown in FIG. 8, an on-off switch is connected at the output of the decision logic unit 46 and may be operated to the "off" position, for example, to assure complete independence in carrier tracking and isolation from the PRN delay locked circuits, when the proposed system is being operated in the coherency validation testing mode examining the accuracy criteria expressed by Equation 14 above.

From the foregoing discussion it should be clear that the method and apparatus described herein permit versatility, adaptability, and several degrees of implementation, with corresponding benefits, in the user's equipment, data processing, and computing routines. For example, the user of the NNSS may:

1. Recover both the time/ranging modulation and the RF carrier doppler shift relative to the local time and frequency standard and cross correlate the information to remove ambiguities and errors of the measurements. This will improve operational measurements in the fleet, which occur frequently with detuned receiving equipment and under poor environmental conditions and with signal-to-noise ratios (SNR) that fall into the regions of cycle slippage and temporary loss-of-lock for the coherent carrier tracking loops. 2. Recover the time/ranging modulation and facilitate epoch measurements which determine time-dependent range rate between satellite and observer. This is supplemental to currently used methods of range rate measurement based upon doppler shift of the RF carrier frequency. 3. Utilize the received energy of the time/ ranging modulation spectra as well as that of the RF carrier signals to approach a maximum in the coherent tracking circuit's effective margin in SNR. Thus, the unique relationships existing between transmitted modulation and RF carriers permit mechanization of correlated coherent tracking loops with modulation-derived VCO forcing functions that discriminate against all orthogonal forcing functions. Either analog or decision directed digital techniques of modulation derived VCO aiding can be used. 4. Recover both the time variable time/ranging marks or epochs and the time variable RF carrier information as received from the satellite. Since successive marker epochs span a mathematically exact integer number of cycles of the RF carriers, relative measurements and correlation routines can be used to develop real time indicators of receivers status from which one can infer the absolute validity of doppler shift data as measured separately by the same receiver for navigation computation purposes. 5. Perform several correlations between measured data on a point-by-point or on a batch basis to study and determine propagation path characteristics as follows:

a. Correlate the 150 and 400 MHz channel doppler shifts of the carriers.
 b. Correlate the 150 and 400 MHz channel variation of propagation path time delay's measured relative to local clock using the time/ranging modulations.
 c. Correlate the 150 MHz channel doppler shift of frequency (phase velocity) with the propagation path delay of the 150 MHz channel time/ ranging modulation epochs (group velocity).
 d. Correlate 400 MHz doppler shift with 400 MHz modulation path delay.
 e. Correlate other data combinations as appropriate.

Figure 9:
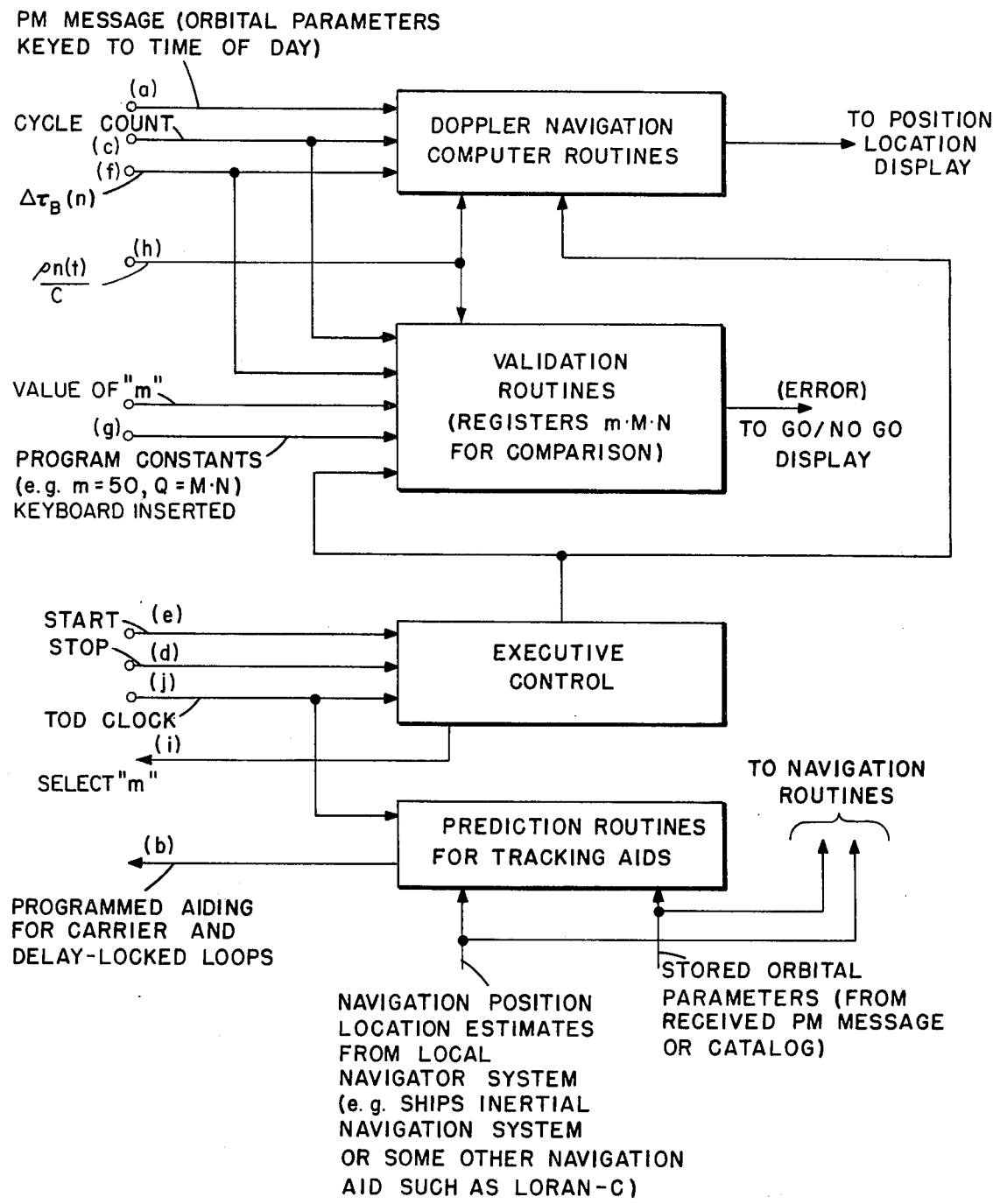

One possible computer configuration for processing the data outputs from the proposed carrier-modulation coherency monitoring apparatus of FIG. 8 is illustrated in the functional block diagram of FIG. 9. Specifically, such computer apparatus would be programmed according to well-known practice to perform the following operational functions:

1. Doppler navigation routines responsive to the orbital parameters contained in the received satellite message and to the measured whole and fractional cycle count would provide control output (e.g. to a suitable display) indicating the user's position location.
2. Validation routines would compute and display the magnitudes of errors between program constants and corresponding measured values, using for example equation 14 above.
3. Executive Control in accordance with the start and stop triggers from FIG. 8 and the time-of-day clock.
4. Prediction Routines responsive to data indicating relative position between the transmitter and receiver sites for providing programmed aiding for tracking and recovery of the carrier and synchronizing code signals.

Various other modifications, adaptations and alterations are of course possible in light of the above teachings. Therefore, it should be understood at this time that within the scope of the appended claims the invention may be practical otherwise than as specifically described.

What is claimed is:

1. In a radio transmission system for transmitting information between spaced location, the combination comprising:

signal source means for generating a carrier signal of radio frequency, $f_{rf}$, source means for generating a synchronizing code having a repetitive time frame which is numerically related to the period, $1/f_{rf}$, of said carrier signal by a predetermined fixed multiplier, modulator means connected to said carrier signal source and said synchronizing code source for modulating said carrier signal with said synchronizing code, transmitter means for transmitting said modulated carrier signal, receiver means for receiving said modulated carrier signal and including means for recovering said carrier signal and said synchronizing code from said modulated carrier signal, and measurement means responsive to said recovered carrier signal and synchronizing code and including counter means and counter control means, said counter control means being responsive to said synchronizing code for controlling said counter means to register a count of the number of whole and fractional cycles of said carrier signal received in a measurement time interval corresponding to the repetitive time frame of said synchronizing code as received.

2. The apparatus specified in claim 1 wherein said counter control means includes means to select a time interval multiplier, whereby said counter means registers a count of the number of whole and fractional cycles of said carrier signal received in a measurement time interval equal to a multiple of the time frame of said synchronizing code.

3. The apparatus specified in claim 1 wherein said recovery means comprises a phase-locked loop to recover the carrier signal component of said received mmodulated carrier signal, and a delay-locked loop to recover the synchronizing code component of said received modulated carrier signal.

4. The apparatus specified in claim 1 further including a source of message code and means for modulating said carrier signal with said meassage code, and wherein said receiver means includes means responsive to said modulated carrier signal for demodulating said modulated carrier signal to recover said message code from said modulated carrier signal.

5. The apparatus specified in claim 1 wherein said signal source means includes, means for generating a pseudo-random noise code as said synchronizing code, and means connected to said pseudo-random noise code generating means for modulating said carrier signal with said pseudo-random noise code.

6. The apparatus specified in claim 1 further including timing means for producing a local time reference and wherein said counter means comprises, first means receiving as input said recovered carrier signal and responsive to said counter control means for registering a count of the number of whole cycles of said carrier signal received in said measurement time interval, second means receiving an input signal defining the time of reception of said synchronizing code and responsive to said timing means for measuring the time of reception of said synchronizing code relative to said local time reference, third means responsive to the measurement provided by said second means for demarcating the beginning and ending time limits of a plurality of successive time frames of said synchronizing code, said third means being connected to said first means to control the value of said measurement time interval during which said first means counts whole cycles of said recovered carrier signal, and fourth means responsive to said third means for registering the duration of any fractional cycle of said recovered carrier signal occurring in said measurement time interval.

7. The apparatus specified in claim 6 wherein the count registered by said first means is dependent upon zero crossing detection of said carrier signal during said measurement time interval and wherein said fourth means includes a zero crossing detector responsive to said carrier signal and rendered effective at the beginning time limit of said measurement time interval and timing means for registering the time interval occurring between the beginning of said measurement time interval and the first zero crossing of said carrier signal within said measurement time interval.

8. The apparatus specified in claim 1 wherein said signal source means comprises a stable oscillator means for generating a carrier frequency signal, a code generator means, and a divider circuit means connected between said stable oscillator means and said code generator means for dividing said carrier frequency signal to produce a control signal whose period is longer by a fixed multiple than the period of said carrier frequency signal, said control signal being applied to said code generator means and establishing the repetitive time frame of said code generator means.

9. The apparatus specified in claim 3 wherein said carrier signal phase-locked recovery loop and said synchronizing code delay-locked recovery loop are interconnected with a signal developed in the delay-locked loop during tracking of the synchronizing code applied to aid the phase-locked loop in tracking the carrier signal, and a signal developed in the phase-locked loop during tracking of the carrier signal applied to aid the delay-locked loop in tracking the synchronizing code.

10. The apparatus specified in claim 9 wherein said signal source means is mounted aboard an orbiting satellite and said receiver means is located at a ground station and further including means connected to each of said phase-locked recovery loop and said delay-locked recovery loop for providing programmed aiding to each of said loops in accordance with the predicted location of said orbiting satellite.

* * * * *